United States Patent
Hirose

(10) Patent No.: US 8,792,829 B2
(45) Date of Patent: Jul. 29, 2014

(54) DATA SUPPLYING APPARATUS, DATA PROCESSING APPARATUS AND DATA COMMUNICATION SYSTEM

(75) Inventor: Takatoshi Hirose, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 906 days.

(21) Appl. No.: 12/988,629

(22) PCT Filed: Jun. 2, 2009

(86) PCT No.: PCT/JP2009/060409
§ 371 (c)(1),
(2), (4) Date: Oct. 19, 2010

(87) PCT Pub. No.: WO2010/001688
PCT Pub. Date: Jan. 7, 2010

(65) Prior Publication Data
US 2011/0053508 A1  Mar. 3, 2011

(30) Foreign Application Priority Data
Jun. 30, 2008  (JP) .................. 2008-171243

(51) Int. Cl.
*H04B 7/00* (2006.01)
*H04B 5/00* (2006.01)

(52) U.S. Cl.
USPC ....................................... 455/41.3; 455/41.1

(58) Field of Classification Search
USPC .................... 455/41.2, 41.3, 41.1, 67.11, 466
See application file for complete search history.

(56) References Cited

U.S. PATENT DOCUMENTS

| | | | |
|---|---|---|---|
| 7,236,755 B2 | 6/2007 | Terai et al. | |
| 7,305,496 B2 | 12/2007 | Ohnishi | |
| 2001/0029531 A1 | 10/2001 | Ohta | |
| 2003/0191738 A1 | 10/2003 | Hoeye et al. | |
| 2005/0237566 A1 | 10/2005 | Sakuda et al. | |
| 2005/0267943 A1 | 12/2005 | Castaldi et al. | |
| 2007/0162181 A1 | 7/2007 | Ichieda | |

FOREIGN PATENT DOCUMENTS

| | | |
|---|---|---|
| CN | 1519733 A | 8/2004 |
| CN | 101001259 A | 7/2007 |
| EP | 1 429 234 A2 | 6/2004 |
| EP | 1 450 264 A2 | 8/2004 |
| EP | 1538819 A1 | 6/2005 |
| JP | 8-195871 A | 7/1996 |
| JP | 2000-209653 A | 7/2000 |
| JP | 2001-282424 A | 10/2001 |
| JP | 2005-223518 A | 8/2005 |
| JP | 2008-41225 A | 2/2008 |
| KR | 10-2004-0016058 A | 2/2004 |
| KR | 10-2004-0109977 A | 12/2004 |

OTHER PUBLICATIONS

"Near Field Communication," Wikipedia, pp. 1-12, last modified Feb. 12, 2013.

(Continued)

*Primary Examiner* — Eugen Yun
(74) *Attorney, Agent, or Firm* — Fitzpatrick, Cella, Harper & Scinto

(57) ABSTRACT

A data supplying apparatus detects a change in the status of the wireless connection established with an external apparatus. When the status of the wireless connection is restored after a change has been detected in the status of the wireless connection, the data supplying apparatus transmits, to the external apparatus, a different data file from the previous data file transmitted by the wireless connection before restoration of the connection.

17 Claims, 12 Drawing Sheets

(56) References Cited

OTHER PUBLICATIONS

European Office Action dated Mar. 4, 2013 issued in corresponding European Patent Application No. 09773266.3.
U.S. Appl. No. 12/988,628, filed Oct. 19, 2010. Applicant: Takatoshi Hirose.
Chinese Office Action dated Dec. 27, 2012 issued in corresponding Chinese Patent Application No. 200980125323.0.
Japanese Office Action dated May 14, 2012 issued in corresponding Japanese Patent Application No. 2008-171243.
European Search Report dated Dec. 5, 2011 issued in corresponding European Patent Application No. 09773266.3.
European Office Action dated Mar. 17, 2014 issued in corresponding European Patent Application No. 09773266.3.
Japanese Office Action dated Mar. 3, 2014 issue in corresponding Japanese Patent Application No. 2012-238322.

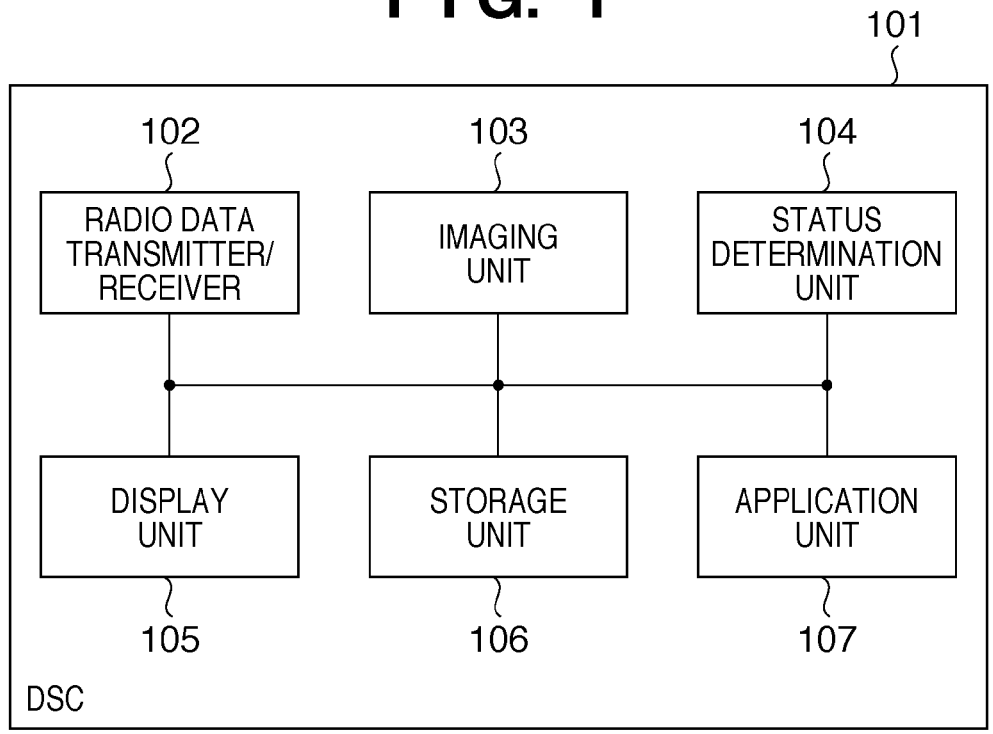
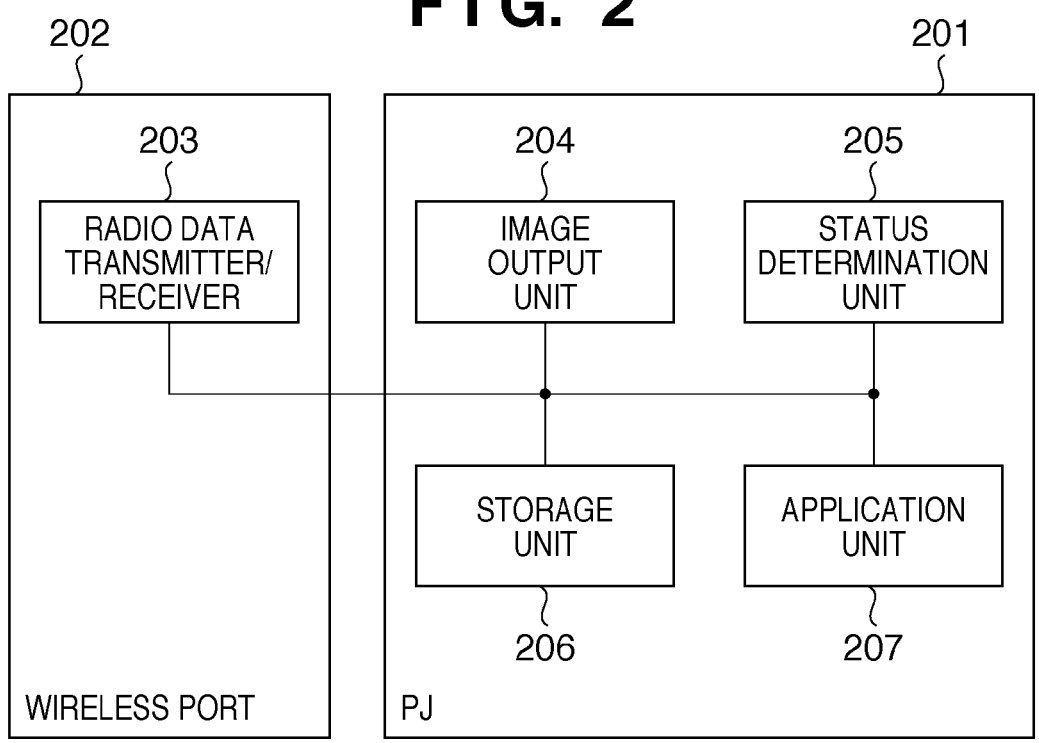

DATA SUPPLYING APPARATUS, DATA PROCESSING APPARATUS AND DATA COMMUNICATION SYSTEM

TECHNICAL FIELD

The present invention relates to a data supplying apparatus for transmitting/receiving data files between apparatuses by wireless communication, a data processing apparatus, a data communication system, and a program.

BACKGROUND ART

RFID (Radio Frequency Identification) and NFC (Near Field Communication) techniques are generally known as techniques for executing short range wireless transfer between devices (e.g., JIS X6319-4 2005, ISO 18092:2004). There is another short range wireless transfer technique called "TransferJet". These transfer techniques have a very short communication range and perform control to connect devices that are to perform communication when they are brought close to each other and to disconnect the devices when they are moved away from each other.

Ordinarily, in order to print images stored in a data supplying apparatus by transferring the images to a data output apparatus by wireless communication, the user has to perform complicated operations including selecting images, and as such, there is a demand to simplify operations. To respond to such a demand, Japanese Patent Laid-Open No. 2005-223518 discloses a technique for improving usability for the user by automatically transferring a plurality of image data files between an image supplying apparatus storing the plurality of image data files and an image storage apparatus in response to establishment of wireless communication.

As already mentioned above, a series of operations involved in the data transfer by the image supplying apparatus requires the user to perform complicated operations, so there is a technical problem in that usability is poor. In addition, the technique of Japanese Patent Laid-Open No. 2005-223518 has a technical problem in that the user cannot select image data files to be transferred because a plurality of image data items stored in the apparatus is transferred upon establishment of wireless communication.

DISCLOSURE OF INVENTION

The present invention has been conceived in view of the above problems, and according to an embodiment of the present invention, a data supplying apparatus, a data processing apparatus and a data communication system are provided in which when transferring a data file using wireless communication established between devices, user's intention can be reflected in selecting a data file to be transferred with a simple operation by the user.

According to one aspect of the present invention, there is provided a data supplying apparatus comprising: a detection means for detecting a change in the status of a wireless connection with an external apparatus; and a transmission means for when the status of the wireless connection is restored after a change has been detected in the status of the wireless connection by the detection means, transmitting a data file that is different from a data file transmitted by wireless connection before the restoration.

Further features of the present invention will become apparent from the following description of exemplary embodiments with reference to the attached drawings.

BRIEF DESCRIPTION OF DRAWINGS

FIG. 1 is a block diagram showing an exemplary configuration of a digital camera as a data supplying apparatus according to an embodiment of the present invention.

FIG. 2 is a block diagram showing an exemplary configuration of a projector as a data processing apparatus according to an embodiment of the present invention.

BEST MODE FOR CARRYING OUT THE INVENTION

Figure 3:
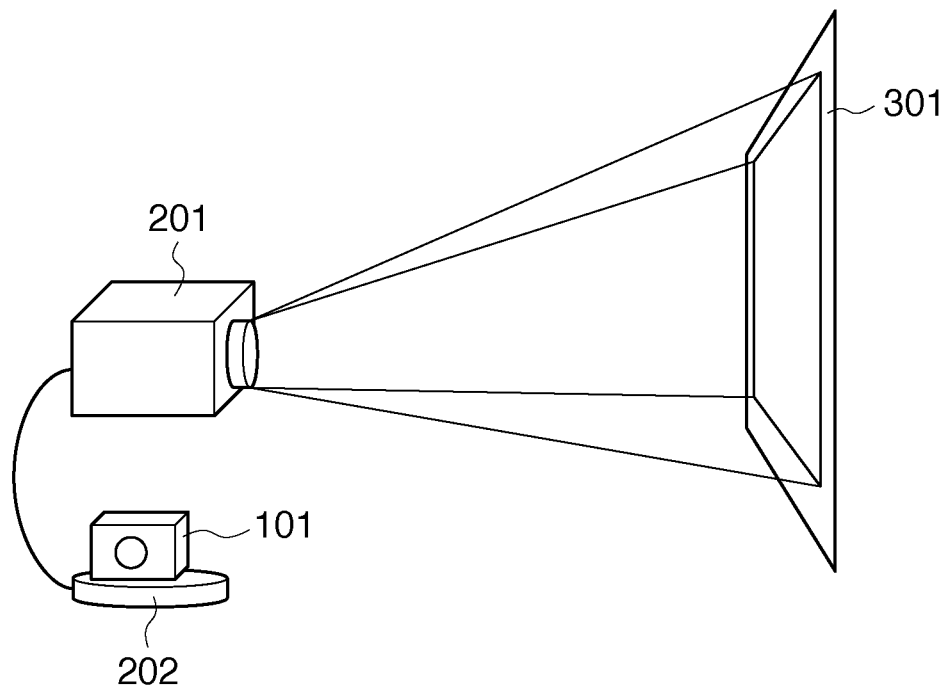
FIG. 3 is a diagram showing an exemplary configuration of a data communication system according to an embodiment of the present invention.

Hereinafter, preferred embodiments of the present invention will be described with reference to the accompanying drawings.

Embodiment 1

In Embodiment 1, in a data communication system that employs a short range wireless transfer technique, a different data file from the previous one is transferred according to the connection/disconnection of the short range wireless communication. The present embodiment describes an example in which image data files are used as data files to be transferred.

FIG. 1 is a block diagram showing an exemplary configuration of a digital camera 101 (hereinafter, DSC 101) as a data supplying apparatus according to Embodiment 1. Here, an example is shown in which the DSC 101 is used as a data supplying apparatus that holds data files and supplies the data files by wireless communication, but the apparatus that can be used as a data supplying apparatus is not limited thereto.

In FIG. 1, a radio data transmitter/receiver 102 establishes a wireless connection with an external apparatus to perform short range wireless transfer and notifies an application unit 107 of establishment of a wireless connection, disconnection of a wireless connection, or the like. An imaging unit 103 includes a lens optical system, an imaging element and an A/D converter, and outputs an image obtained by capturing an object in the form of a data file. A status determination unit 104 determines the operating status of various operating components of the DSC 101. In the present embodiment, the status determination unit 104 detects the disconnection of a wireless connection and notifies the application unit 107 of the disconnection.

A display unit 105 includes a liquid crystal panel, and provides a display for an electronic viewfinder (EVF), displays an image data file held by a storage unit 106 and the like. The storage unit 106 stores image data files output by the imaging unit 103. The application unit 107 executes various controls on the DSC 101. For example, the application unit 107 selects an image data file to be transmitted from the radio data transmitter/receiver 102 based on a notification from the radio data transmitter/receiver 102 such as a notification of connection establishment or a notification of a disconnection.

FIG. 2 is a block diagram showing an exemplary configuration of a projector 201 (hereinafter, PJ 201) as a data processing apparatus according to Embodiment 1 that receives image data files from the above-described data supplying apparatus. Here, an example is shown in which the PJ 201 is used as a data processing apparatus that receives data files from the data supplying apparatus, but the apparatus that can be used as a data processing apparatus is not limited thereto.

In FIG. 2, a wireless port 202 includes a radio data transmitter/receiver 203, and establishes a wireless connection with an external apparatus to perform short range wireless transfer. An image output unit 204 includes a projection light source and an optical system, and projects an image based on the image data files stored in a storage unit 206 onto an external screen. A status determination unit 205 determines the operating status of various operating components of the PJ 201. The storage unit 206 stores image data files received from the external apparatus via the radio data transmitter/receiver 203. An application unit 207 executes various controls on the PJ 201.

FIG. 3 is a diagram showing a configuration of a data communication system according to Embodiment 1. The DSC 101, the PJ 201 and the wireless port 202 have already been described above. In the present embodiment, it is assumed that the PJ 201 is connected to the wireless port 202, but it is also possible to adopt a configuration in which the wireless port 202 is incorporated in the PJ 201. The wireless port 202 and the DSC 101 are capable of transferring image data files stored in the storage unit 106 of the DSC 101 using a short range wireless transfer technique between the radio data transmitter/receiver 102 and the radio data transmitter/receiver 203. The image data files transferred to the PJ 201 are projected onto a screen 301 by the action of the image output unit 204.

Figure 12:
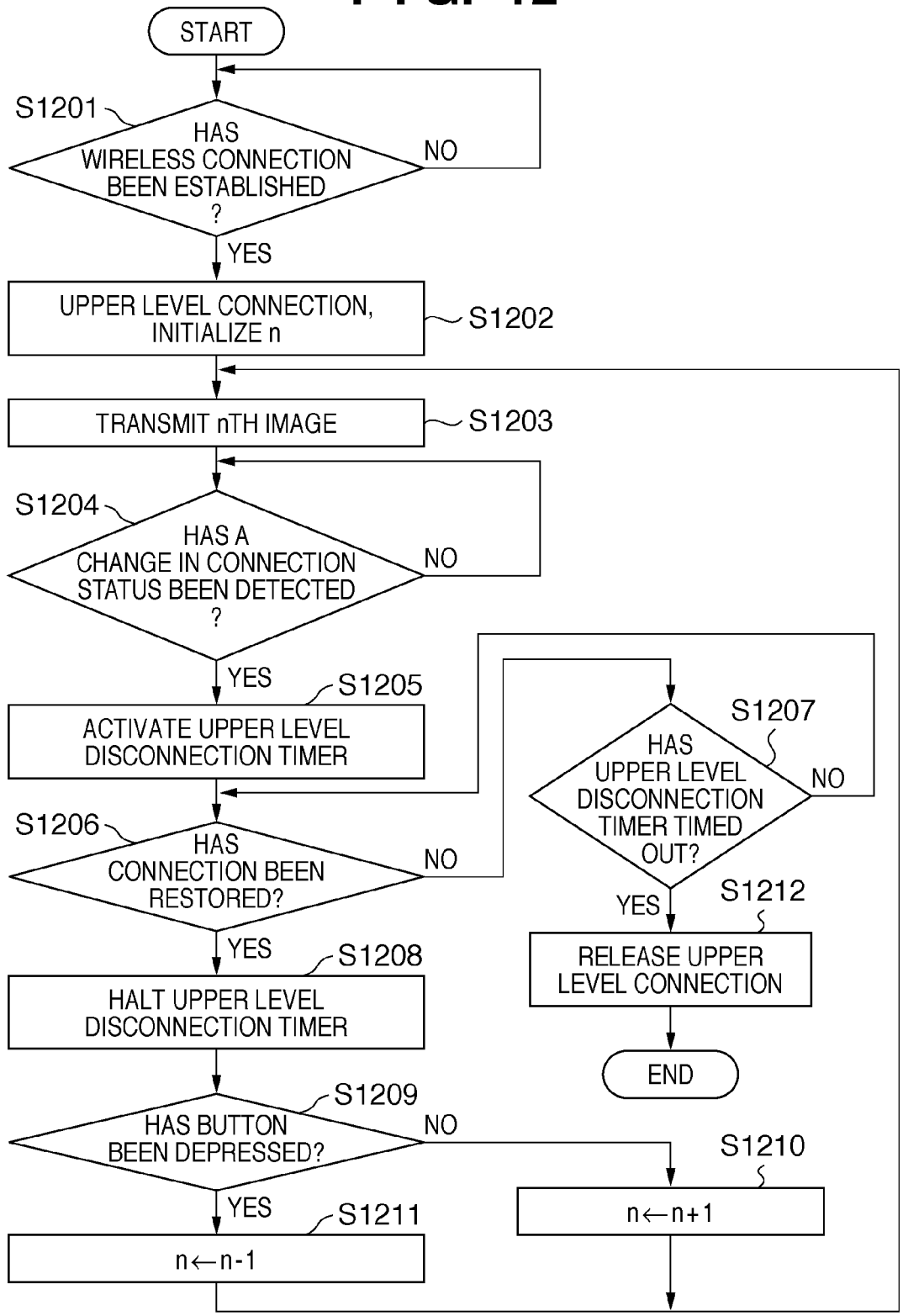
FIG. 12 is a flowchart used to illustrate an operation performed by a digital camera according to Embodiment 1.

A sequence for transferring a data file performed by the data communication system of the present embodiment configured as described above will be described with reference to the sequence diagrams of FIGS. 4, 6 and 7 and the flowchart of FIG. 12. In each of the sequence diagrams, DSC-App represents the application unit 107 of the DSC 101, and DSC-Network represents the radio data transmitter/receiver 102 of the DSC 101. Likewise, PJ-Network represents the radio data transmitter/receiver 203 of the wireless port 202, and PJ-App represents the application unit 207 of the PJ 201. The flowchart of FIG. 12 shows an operation performed by the application unit 107 of the DSC 101.

The following operation is performed by a user and the apparatuses when the user projects image data being displayed on the display unit 105 of the DSC 101 with the PJ 201.

First, the DSC 101 is brought to within a specified distance from the wireless port 202 (S401). Then, the DSC 101 and the PJ 201 enter a connected status by the short range wireless transfer technique (S402). Within the respective apparatuses, the radio data transmitter/receivers 102 and 203 notify the application units 107 and 207 of the connected status (S403, S404). Upon receiving such a notification, each of the application units 107 and 207 performs an upper level connection (S405) and enters an image transferring status. As used herein, "upper level connection" means that an upper level protocol is logically brought into a connected status. When the application unit 107 of the DSC 101 ascertains that it has entered an image transferring status, the image data file being displayed on the display unit 105 of the DSC 101 is transferred from the storage unit 106 to the radio data transmitter/receiver 102 (S406). The image data file transferred via the radio data transmitter/receiver 203 of the wireless port 202 (S407) to the application unit 207 of the PJ 201 (S408) by the short range wireless transfer technique is projected onto the screen 301 by the image output unit 204 (S409).

The process performed by the application unit 107 in the above-described sequence will be described below with reference to the flowchart of FIG. 12. First, upon receiving a notification indicating that a wireless connection has been established with an external apparatus from the radio data transmitter/receiver 102, the procedure advances from step S1201 to step S1202. In step S1202, the application unit 107 performs an upper level connection with the application unit 207, and sets an image to be transmitted. In the present embodiment, it is assumed that the nth image is to be transmitted, and n is set such that the image being displayed on the display unit 105 is to be transmitted. After that, in step S1203, the application unit 107 transmits the nth image data file to the external apparatus via the radio data transmitter/receiver 102. In the manner described above, when the DSC 101 and the wireless port 202 are brought close to each other, the image being displayed on the DSC 101 is transferred to and projected by the PJ 201, and therefore an image displayed on the DSC 101 can be projected with a simple operation.

An operation as described below is performed when the user wants to project, with the PJ 201, the next image, which comes after the image previously transmitted, among the images stored in the storage unit 106 of the DSC 101. As used herein, "next image" refers to an image that comes after the previously transmitted image in sorted order when the image data files are sorted by a predetermined criteria (e.g., captured date), and the corresponding image data file is referred to as the "next image data file".

First, the DSC 101, which was close to the wireless port 202, is moved away from the wireless port 202 (S701). When the DSC 101 and the wireless port 202 are moved away from each other a specified distance or more, the DSC 101 and the PJ 201 enter a disconnected status by the short range wireless transfer technique (S702). Within the respective apparatuses, the radio data transmitter/receivers 102 and 203 detect the disconnected status, and notify the application units 107 and 207 of the disconnected status (S703, S704). Upon receiving the notification, each of the application units 107 and 207 activates an upper level disconnection timer. The value of the timer may be set in the apparatus, or may be set by the user. In the PJ 201, the application unit 207 stops the projection of the image in response to the notification of the disconnected status.

When the DSC 101 is brought close to the wireless port 202 by the user before the upper level disconnection timers time out (S705), the DSC 101 and the PJ 201 again enter a connected status (S706). Then, the radio data transmitter/receivers 102 and 203 notify the application units 107 and 207 of the connected status (S707, 708). Each of the application units 107 and 207 detects that the connected status has been restored with the notification, and halts their respective upper level disconnection timer. The application unit 107 of the DSC 101 that has received the notification transfers the next image data file from the storage unit 106 to the application unit 207 of the PJ 201 (S709 to S712). The next image data file transferred to the application unit 207 of the PJ 201 is projected onto the screen 301 by the image output unit 204 (S713). At this time, on the DSC 101 side, it is possible to adopt a configuration in which the image data file that has been transmitted to the PJ 201 is displayed on the display unit 105 of the DSC 101 (S714). A configuration can also be adopted in which the projected image is continuously projected in the disconnected status. As described above, when the DSC 101 and the wireless port 202 are moved away from each other, and then again brought close to each other before the timers time out, the next image is transferred from the DSC 101 to the PJ 201, so the projected image can be updated. With repetition of this operation by the user, the projected image can be updated one after another with a simple operation.

When the user wants to project a previous image stored in the storage unit 106 of the DSC 101 with the PJ 201, an operation as described below is performed. As used herein, "previous image" refers to an image that comes before the previously transmitted image in sorted order when the image data files are sorted by a predetermined criteria, and the corresponding image data file is referred to as the "previous image data file".

First, the DSC 101, which was close to the wireless port 202, is moved away from the wireless port 202 (S715). Then, the DSC 101 and the PJ 201 enter a disconnected status by the short range wireless transfer technique (S716). Within the respective apparatuses, a notification indicating that the connection has been disconnected is sent to the application units 107 and 207 (S717, S718). Upon receiving the notification, each of the application units 107 and 207 activates an upper level disconnection timer, and the PJ 201 stops the projection of the image. The operations up to here are the same as those of S701 to S704.

When the DSC 101 and the wireless port 202 are brought close to each other by the user while depressing a particular button of the DSC 101 (operating a particular operation switch) before the upper level disconnection timers time out (S719), the DSC 101 and the PJ 201 again enter a connected status (S720). Within the respective apparatuses, the radio data transmitter/receivers 102 and 203 notify the application units 107 and 207, respectively, of the connected status (S721, S722). In response to the notification, each of the application units 107 and 207 detects that the connected status has been restored, and halts their respective upper level disconnection timer. When the status determination unit 104 detects that a particular button has been depressed (S723), the application unit 107 of the DSC 101 that has received the notification designates the previous image data file as an image to be transmitted (S724). The previous image data file is transferred from the storage unit 106 to the application unit 207 of the PJ 201 (S725 to S727). The previous image data file that has been transferred to the application unit 207 of the PJ 201 is projected onto the screen 301 by the image output unit 204 (S728). At this time, on the DSC 101 side, it is possible to adopt a configuration in which the image data file that has been transmitted to the PJ 201 is displayed on the display unit 105 of the DSC 101 (S729). As described above, when the DSC 101 and the wireless port 202 are moved away from each other, and then again brought close to each other with a particular button of the DSC 101 being depressed before the timers time out, the previous image is transferred from the DSC 101 to the PJ 201, so the projected image can be updated. With repetition of this operation by the user, the projected image can be returned to a previous image one after another with a simple operation. Therefore, a next or previous image can be displayed with a simple operation by simply moving the DSC 101 close to or away from the wireless port 202 with or without depressing a particular button.

A sequence performed when the upper level disconnection timers time out will be described with reference to FIG. 6. The processes of S601 to S604 are the same as those of S701 to S704. When the upper level disconnection timers activated by the application units 107 and 207 time out (S605, S606), an upper level disconnection is performed (S607), and the image transferring status is terminated. The application units 107 and 207 each reset the settings of the image transferring status (S608, S609).

The process performed by the application unit 107 of the DSC 101 for implementing the above sequence will be described with reference to the flowchart of FIG. 12.

Upon receiving a notification indicating that the wireless connection has been disconnected from the radio data transmitter/receiver 102, the application unit 107 determines that the status of wireless connection has been changed, and advances the procedure from step S1204 to step S1205. In step S1205, the application unit 107 activates its upper level disconnection timer. When the application unit 107 receives a notification indicating that the wireless connection has been connected from the radio data transmitter/receiver 102 before the upper level disconnection timer times out, the application unit 107 determines that the wireless connection has been restored, and advances the procedure from step S1206 to step S1208. Then, in step S1208, the application unit 107 halts the upper level disconnection timer. In step S1209, the application unit 107 determines whether or not a particular button has been depressed based on the reception or non-reception of a notification from the status determination unit 104. When it is determined that the button has not been depressed, n is incremented by one by the application unit 107 in step S1210 so that the next image data file is selected. When, on the other hand, it is determined that the particular button has been depressed, n is decremented by one in step S1211 so that the previous image data file is selected. Then, in step S1203, the application unit 107 transmits the nth image data file to the PJ 201 via the radio data transmitter/receiver 102. When the upper level disconnection timer times out before the restoration of the connection is detected, the procedure advances from step S1207 to step S1212, where the application unit 107 releases the upper level connection and ends the process.

Figure 4:
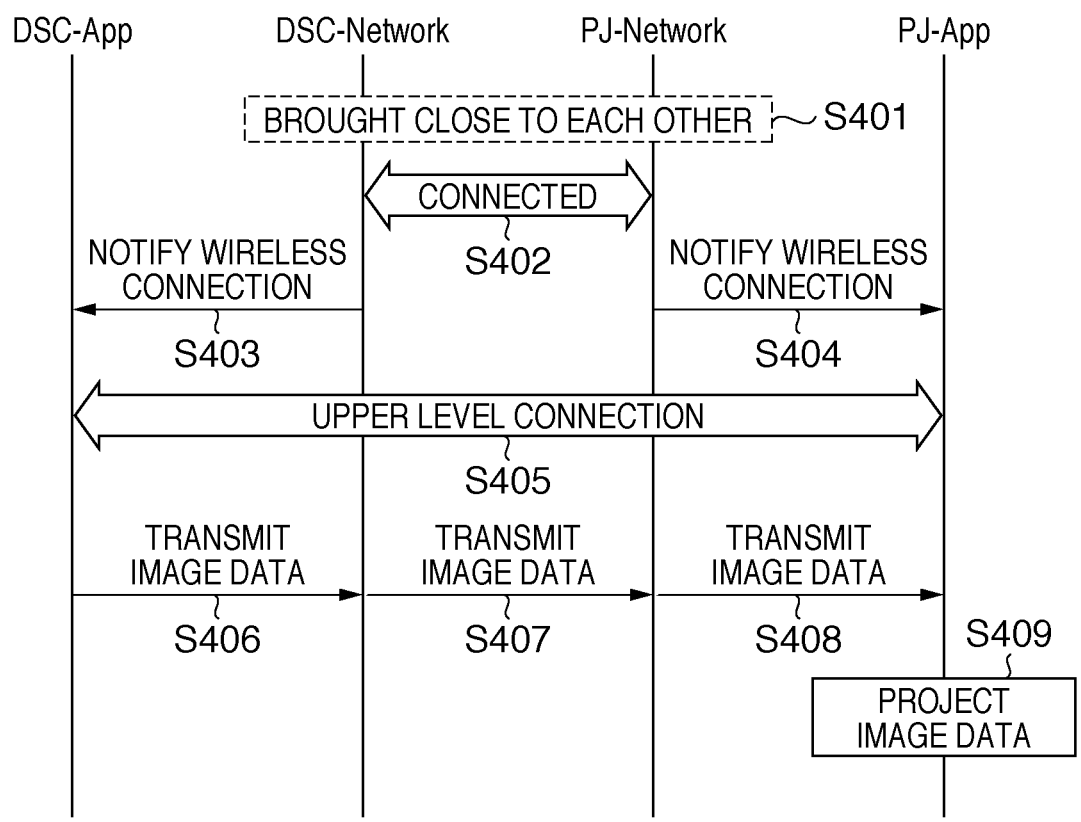
FIG. 4 is a sequence diagram of an upper level connection according to Embodiment 1.
Figure 6:
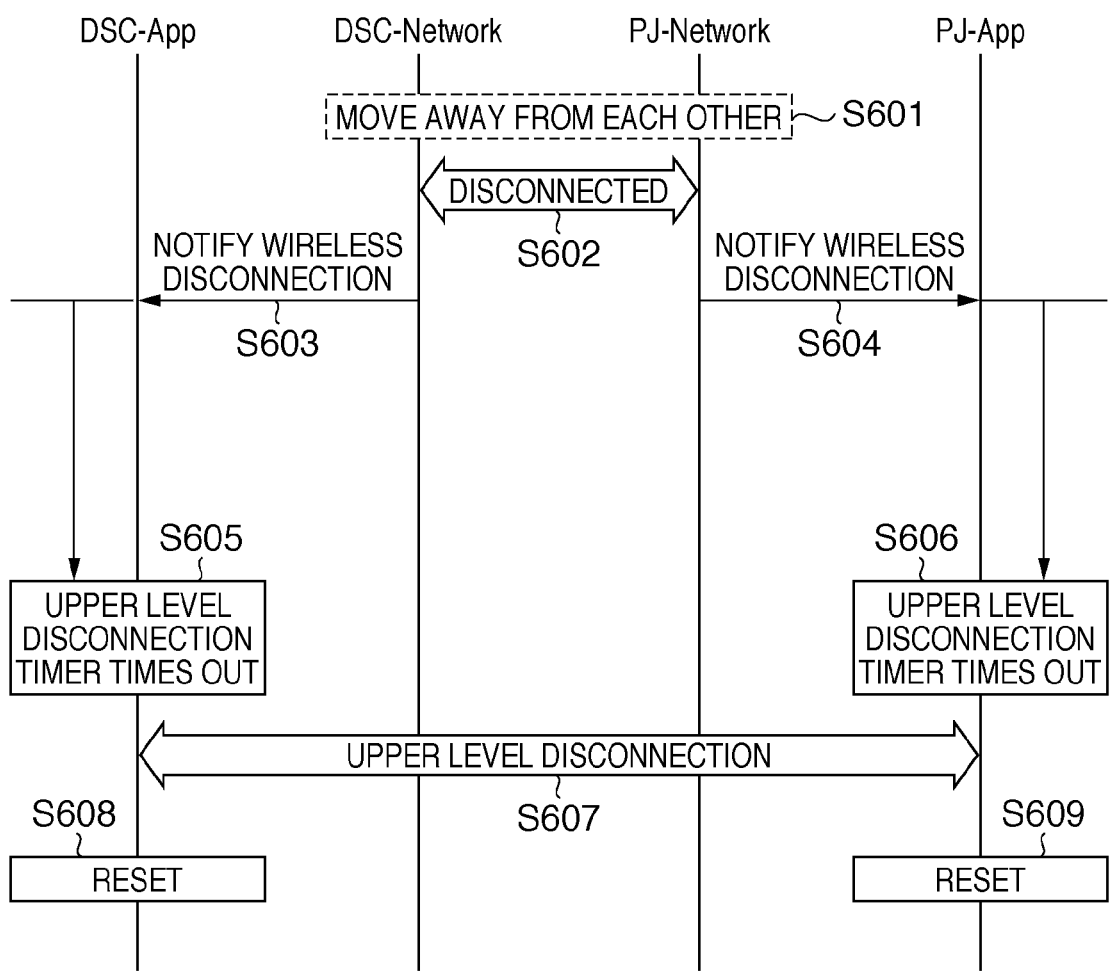
FIG. 6 is a sequence diagram of an upper level disconnection according to Embodiments 1 to 4.
Figure 7:
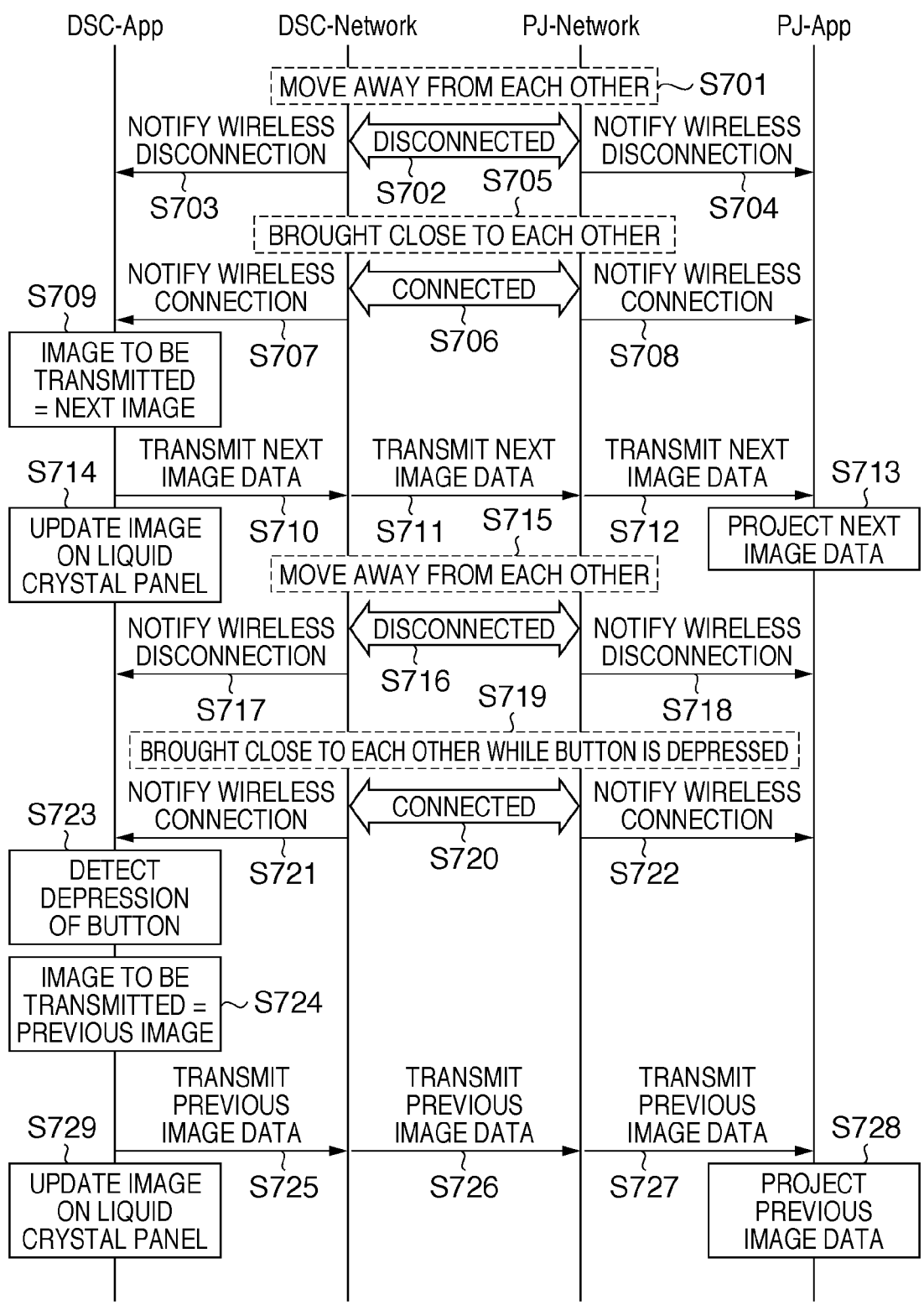
FIG. 7 is a main sequence diagram according to Embodiment 1.

The operation performed by the application unit 207 of the PJ 201 is not shown in a flowchart because it is clear from the sequence diagrams of FIGS. 4, 6 and 7.

In the foregoing, the operation of transferring a different image data file from the previous image data file under control of the DSC according to the connection/disconnection by the short range wireless transfer technique in the wireless image output system of the present invention was described, but the wireless communication that can be used is not limited thereto, and for example, it is possible to use the connection/disconnection by a wireless technique such as Bluetooth® or NFC.

In addition, in the foregoing description, the timing at which the next image/previous image is designated as an image to be transferred is after the DSC 101 and the wireless port 202 are again brought close to each other, but it can be when the connection is disconnected before they are again brought close to each other. Specifically, a configuration may be adopted in which the image to be transmitted when the DSC 101 and the wireless port 202 are again brought close to each other can be set to either the next image or the previous image according to the time during which the DSC 101 is placed on the wireless port 202. For example, if the DSC 101 is placed on the wireless port 202 for less than one second, the next image is transferred when the connection is reconnected, and if the connection is disconnected after the DSC 101 is placed on the wireless port 202 for one second or more, the previous image is transferred. It is of course possible to adopt a configuration in which the previous image is transferred when the connection is reconnected after the DSC 101 is placed on the wireless port 202 for less than a specified time, and the next image is transferred when the connection is reconnected after the DSC 101 is placed on the wireless port 202 for the specified time or more.

Furthermore, in the foregoing, a configuration was described in which the previous image is selected by performing a connection process while a button is depressed, but the present invention is not limited thereto, and the button operation can be replaced by a configuration capable of recognizing a change in the status using a sensor or the like such as, for example, bringing the DSC 101 close to the wireless port 202 with the DSC 101 being overturned, or brining the DSC 101 close to the wireless port 202 with increased acceleration. It is also possible to adopt a configuration in which the next image is transmitted when a connection is established with a button being depressed, and the previous image is transferred when a connection is established with the button not depressed.

As described above, according to Embodiment 1, whether or not the status of wireless connection has been restored is determined within a predetermined time after a notification indicating that a change has been detected in the status of wireless connection is received from the radio data transmitter/receiver 102 (before the upper level disconnection timers time out). When it is determined that the status of wireless connection has been restored within the predetermined time, transmission control is performed such that a different data file from the data file transmitted by the previous wireless connection before restoration of the connection is transmitted. Accordingly, the image data outputted by the image output apparatus can be changed by the user moving the image supplying apparatus close to or away from the image output apparatus. In other words, it becomes possible to output a selected image merely with a simple operation by the user.

Embodiment 2

Figure 5:
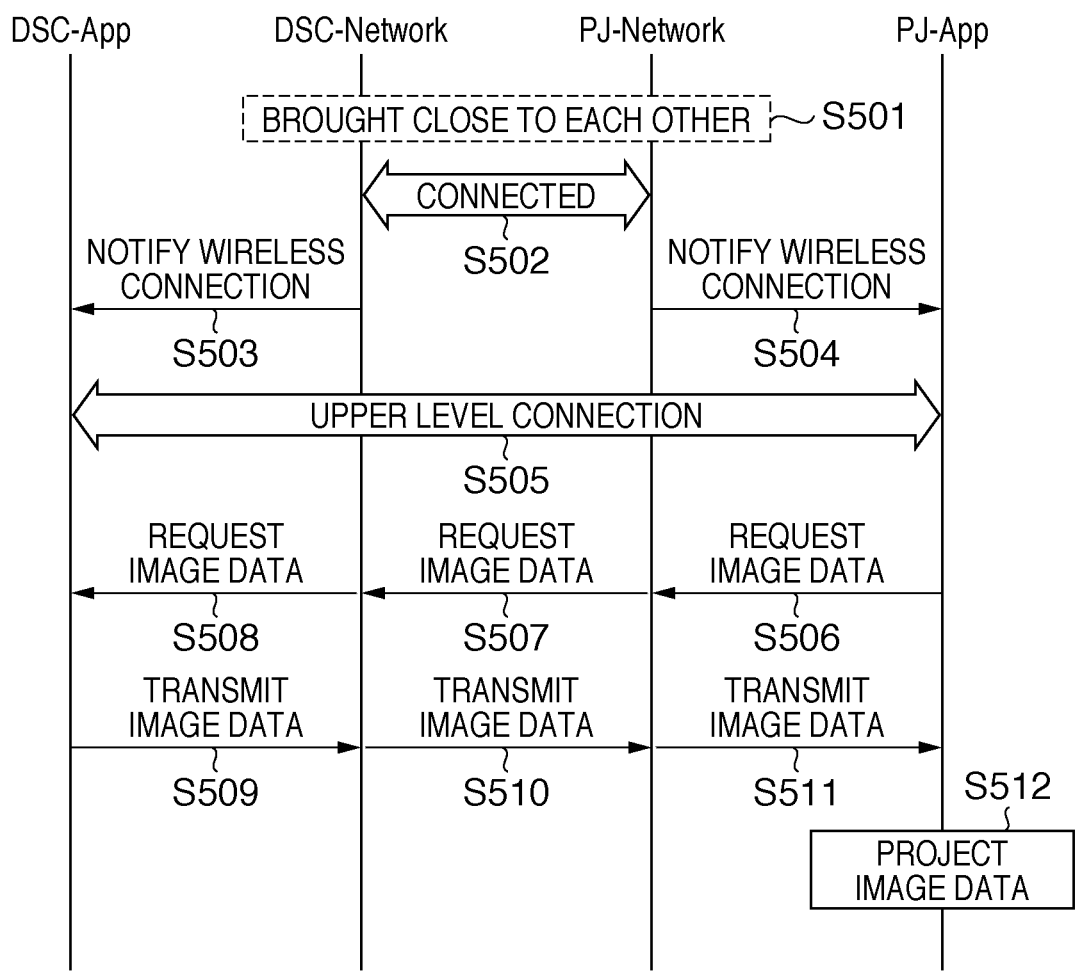
FIG. 5 is a sequence diagram of an upper level connection according to Embodiments 2 to 4.
Figure 8:
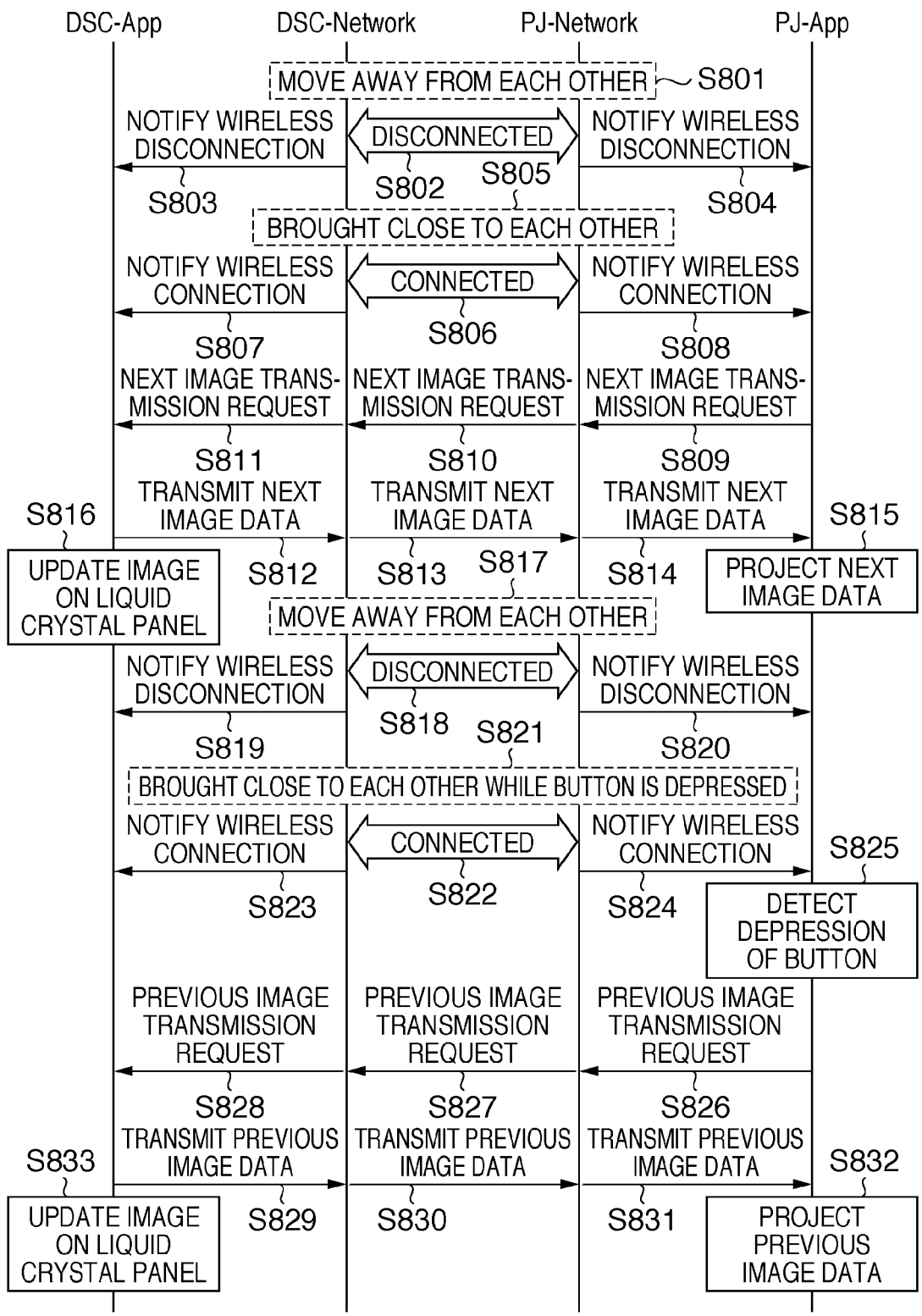
FIG. 8 is a main sequence diagram according to Embodiment 2.

In Embodiment 1, on the DSC 101 side, the next image data file or the previous image data file is determined as a data file to be transmitted. In Embodiment 2, in a system that employs a short range wireless transfer technique, on the PJ 201 side, the next image data file or the previous image data file is determined as a data file to be transmitted from the DSC 101. The configurations of a DSC 101, a PJ 201 and a data communication system according to Embodiment 2 are the same as those of Embodiment 1 described above (FIGS. 1 to 3). Hereinafter, an operation of transferring a different image data file from the previous image data file according to the connection/disconnection by the short range wireless transfer technique according to Embodiment 2 will be described with reference to the sequence diagrams of FIGS. 5, 6 and 8 and the flowchart of FIG. 13.

When the user projects the image data being displayed on the display unit 105 of the DSC 101 with the PJ 201, an operation as described below is performed.

First, the DSC 101 is brought to within a specified distance from the wireless port 202 (S501). Then, the DSC 101 and the PJ 201 enter a connected status by the short range wireless transfer technique (S502). Within the respective apparatuses, the connected status is notified to the application units 107 and 207 (S503, S504). Each of the application units 107 and 207 that has received the notification performs an upper level connection (S505) and enters an image transferring status. When the PJ 201 ascertains that it has entered the image transferring status, the PJ 201 issues a request to transfer the image data file being displayed on the display unit 105 of the DSC 101 (S506 to S508). The application unit 107 of the DSC 101 that has received the request to transfer the image data file transfers the image data file being displayed to the radio data transmitter/receiver 102 from the storage unit 106 (S509). The image data file transferred via the radio data transmitter/receiver 203 of the wireless port 202 (S510) to the application unit 207 of the PJ 201 (S511) by the short range wireless transfer technique is projected onto the screen 301 by the image output unit 204 (S512).

The process performed by the application unit 207 in the above sequence will be described below with reference to the flowchart of FIG. 13. First, upon receiving a notification indicating that a wireless connection has been established with an external apparatus (DSC 101) from the radio data transmitter/receiver 203, the procedure advances from step S1301 to step S1302. In step S1302, the application unit 207 performs an upper level connection with the application unit 107. Then, in step S1303, the application unit 207 transmits, to the external apparatus (DSC 101), an image transmission request that requests the transmission of an image data file via the radio data transmitter/receiver 203. In response to the image transmission request from the PJ 201, the DSC 101 transmits the image data file currently displayed on the display unit 105 to the PJ 201. In step S1304, the PJ 201 receives the image data file transmitted by the DSC 101.

When the user wants to project the next image (next image data file) stored in the storage unit 106 of the DSC 101 with the PJ 201, an operation as described below is performed.

First, the DSC 101, which was close to the wireless port 202, is moved away from the wireless port 202 (S801). When the DSC 101 and the wireless port 202 are moved away from each other a specified distance or more, the DSC 101 and the PJ 201 enter a disconnected status by the short range wireless transfer technique (S802). Within the respective apparatuses, the disconnected status is notified to the application units 107 and 207 (S803, S804). Each of the application units 107 and 207 that has received the notification activates their respective upper level disconnection timer. The value of the timer may be configured to be preset in the apparatus, or set by the user. The PJ 201 stops the projection of the image.

When the DSC 101 is brought close to the wireless port 202 by the user before the upper level disconnection timers time out (S805), the DSC 101 and the PJ 201 again enter a connected status (S806). Then, the radio data transmitter/receivers 102 and 203 notify the application units 107 and 207, respectively, of the connected status (S807, S808). The application unit 207 of the PJ 201 that has received the notification issues a request to transfer the next image data file (S809 to S811). Each of the application units 107 and 207 halts their respective upper level disconnection timer. The application unit 107 of the DSC 101 that has received the request to transfer the next image data file transfers the image data file to the radio data transmitter/receiver 102 from the storage unit 106 (S812). The image data file is transferred to the application unit 207 of the PJ 201 (S814) via the radio data transmitter/receiver 203 of the wireless port 202 (S813) by the short range wireless transfer technique. The image data file thus transferred is projected onto the screen 301 by the image output unit 204 (S815). At this time, on the DSC 101 side, it is possible to adopt a configuration in which the image data file that has been transmitted to the PJ 201 is displayed on the display unit 105 of the DSC 101 (S816). It is also possible to adopt a configuration in which the projected image is continuously projected in the disconnected status.

On the other hand, when the user wants to project the previous image stored in the storage unit 106 of the DSC 101 with the PJ 201, an operation as described below is performed.

First, the DSC 101, which was close to the wireless port 202, is moved away from the wireless port 202 (S817). Then, the DSC 101 and the PJ 201 enter a disconnected status by the short range wireless transfer technique (S818). Within the respective apparatuses, the disconnected status is notified to the application units 107 and 207 (S819, S820). Each of the application units 107 and 207 that has received the notification activates their respective upper level disconnection timer, and the PJ 201 stops the projection of the image. When the DSC 101 is brought close to the wireless port 202 by the user while depressing a particular button of the PJ 201 before the upper level disconnection timers time out (S821), the DSC 101 and the PJ 201 again enter a connected status (S822). Then, the radio data transmitter/receivers 102 and 203 notify the application units 107 and 207, respectively, of the connected status (S823, S824). Each of the application units 107 and 207 halts their respective upper level disconnection timer. When the status determination unit 205 detects that the button has been depressed (S825), the application unit 207 of the PJ 201 that has received the notification issues a request to transfer the previous image data file (S826 to S828).

The application unit 107 of the DSC 101 that has received the request to transfer the previous image data file transfers the image data file from the storage unit 106 to the radio data transmitter/receiver 102 (S829). The image data file is transferred to the application unit 207 of the PJ 201 (S831) via the radio data transmitter/receiver 203 of the wireless port 202 (S830) by the short range wireless transfer technique. The image data file thus transferred is projected onto the screen 301 by the image output unit 204 (S832). At this time, on the DSC 101 side, it is possible to adopt a configuration in which the image data file that has been transmitted to the PJ 201 is displayed on the display unit 105 of the DSC 101 (S833).

The sequence performed when the upper level disconnection timers activated by the application units 107 and 207 time out is the same as that described in Embodiment 1 (FIG. 6).

The process performed by the application unit 207 of the PJ 201 for implementing the above sequence will be described with reference to the flowchart of FIG. 13.

Upon receiving a notification indicating that the wireless connection has been disconnected from the radio data transmitter/receiver 203, the application unit 207 determines that the status of wireless connection has been changed, and advances the procedure from step S1305 to step S1306. In step S1306, the application unit 207 activates the upper level disconnection timer. When the application unit 207 receives a notification indicating that the wireless connection has been connected from the radio data transmitter/receiver 203 before the upper level disconnection timer times out, the application unit 207 determines that the wireless connection has been restored, and advances the procedure from step S1307 to step S1309, where the application unit 207 halts the upper level disconnection timer. In step S1310, the application unit 207 determines whether or not a particular button of the PJ 201 has been depressed based on the reception or non-reception of a notification from the status determination unit 205. When it is determined that the particular button has not been depressed, in step S1311, the application unit 207 transmits a next image transmission request that requests the transmission of the next image data file to the DSC 101 via the radio data transmitter/receiver 203. When, on the other hand, it is determined that the particular button has been depressed, in step S1312, the application unit 207 transmits a previous image transmission request that requests the transmission of the previous image data file to the DSC 101 via the radio data transmitter/receiver 203. Then, in step S1304, the application unit 207 receives the image data file from the DSC 101 via the radio data transmitter/receiver 203. When the upper level disconnection timer times out before the restoration of the connection is detected, the procedure advances from step S1308 to step S1314, where the application unit 207 releases the upper level connection and ends the process.

The application unit 107 of the DSC 101 according to Embodiment 2 transmits an image data file in response to an image transmission request, a previous image transmission request or a next image transmission request from the PJ 201. The operation performed by the application unit 107 of the DSC 101 is not shown in a flowchart because it is clear from the sequence diagrams of FIGS. 5, 6 and 8.

In the foregoing, the operation of transferring a different image data file from the previous image data file under control of both the DSC and the PJ according to the connection/disconnection by the short range wireless transfer technique in the wireless image output system of the present invention was described, but the wireless communication that can be used is not limited thereto, and for example, it is possible to use the connection/disconnection by a wireless technique such as Bluetooth® or NFC.

In addition, in the foregoing description, the timing at which the next image/previous image is designated as an image to be transferred is after the DSC 101 and the wireless port 202 are again brought close to each other, but it can be when the connection is disconnected before they are again brought close to each other. Specifically, a configuration may be adopted in which the image to be requested when the DSC 101 and the wireless port 202 are again brought close to each other can be set to either the next image or the previous image according to the time during which the DSC 101 is placed on the wireless port 202.

Furthermore, an instruction to select the previous image data file or the next image data file is made by performing a connection process while a button is depressed, but the present invention is not limited thereto, and the button operation can be replaced by a configuration capable of recognizing a change in the status using a sensor or the like such as, for example, bringing the DSC 101 close to the wireless port 202 with the DSC 101 being overturned, or brining the DSC 101 close to the wireless port 202 with increased acceleration. It is also possible to adopt a configuration in which the DSC 101 notifies the PJ 201 of whether or not a button has been depressed, and the image that the PJ 201 requests the DSC 101 to transmit is changed depending on whether the DSC 101 is brought close to the wireless port 202 with or without a button being depressed when the connection is reconnected.

Embodiment 3

Figure 9:
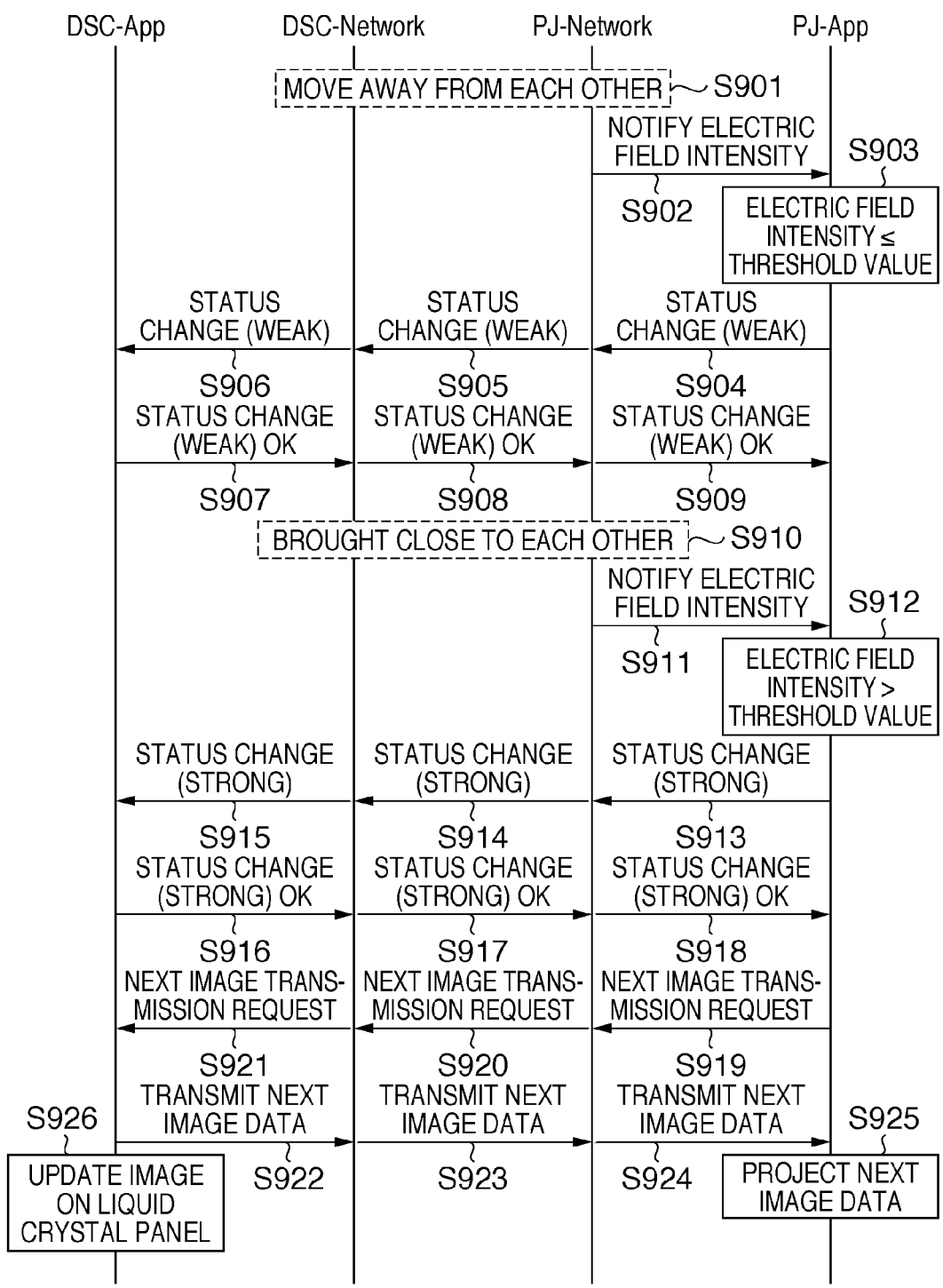
FIG. 9 is a main sequence diagram according to Embodiment 3.

In Embodiments 1 and 2, in order to select a data file to be transferred, disconnection and restoration of wireless connection are utilized as changes in the status of wireless connection, but the present invention is not limited thereto. In Embodiment 3, a configuration will be described in which an image data file to be transferred is changed according to the electric field intensity of a short range wireless transfer technique as a change in the status of wireless connection. The configurations of a DSC 101, a PJ 201 and a data communication system according to Embodiment 3 are the same as those of Embodiment 1 described above (FIGS. 1 to 3). Hereinafter, an operation according to Embodiment 3 will be described with reference to FIGS. 5, 6 and 9.

The operation performed by the user to project the image data being displayed on the display unit 105 of the DSC 101 with the PJ 201 was described in Embodiment 2 (FIG. 5), so a description thereof is omitted here. It is assumed in Embodiment 3 that the distance between the DSC 101 and the wireless port 202 is changed within the range in which the wireless connection is not disconnected, and an electric field intensity threshold value used to determine whether the DSC 101 is close to or far from the wireless port 202 is set in advance in the PJ 201.

When the user wants to project the next image stored in the storage unit 106 of the DSC 101 with the PJ 201, an operation as described below is performed.

When the DSC 101, which was close to the wireless port 202, is moved away from the wireless port 202 (S901), an electric field intensity value is notified by the wireless port 202, and is received by the application unit 207 of the PJ 201 (S902). The timing at which the electric field intensity value is notified can be set to any timing such as a specified interval or when there is a change in the status. Then, the status determination unit 205 of the PJ 201 compares the notified electric field intensity value with the preset threshold value. When the electric field intensity value is lower than the threshold value (S903), in order to change the status of the image output system, a status ("weak") change message is transmitted from the application unit 207 of the PJ 201 to the radio data transmitter/receiver 203 of the wireless port 202 (S904). The message is transmitted from the PJ 201 via the radio data transmitter/receivers 203 and 102 (S905) to the application unit 107 of the DSC 101 (S906) by the short range wireless transfer technique.

The application unit 107 of the DSC 101 that has received the status ("weak") change message transmits a response message to the application unit 207 of the PJ 201 (S907 to S909). Each of the application units 107 and 207 changes their respective status, and activates their respective upper level disconnection timer. The value of the timer may be a fixed value set by the apparatus, or may be a value set by the user. The PJ 201 stops the projection of the image.

When the DSC 101 is brought close to the wireless port 202 by the user before the upper level disconnection timers time out (S910), and an electric field intensity value is notified to the application unit 207 of the PJ 201 (S911), the status determination unit 205 of the PJ 201 again compares the electric field intensity value with the threshold value. When the electric field intensity value is higher than the threshold value (S912), in order to change the status of the image output system, a status ("strong") change message is transmitted from the application unit 207 of the PJ 201 to the radio data transmitter/receiver 203 of the wireless port 202 (S913). The message is transmitted via the radio data transmitter/receiver 102 of the DSC 101 (S914) to the application unit 107 of the DSC 101 (S915) by the short range wireless transfer technique.

The application unit 107 of the DSC 101 that has received the status ("strong") change message transmits a response message to the application unit 207 of the PJ 201 (S916 to S918). Thereby, each of the application units 107 and 207 changes their respective status, and halts the upper level disconnection timer. The application unit 207 of the PJ 201 that has received the status ("strong") change message issues a request to transfer the next image data file (S919 to S921). The application unit 107 of the DSC 101 that has received the request to transfer the next image data file transfers the image data file from the storage unit 106 to the radio data transmitter/receiver 102 (S922). The image data file transferred via the radio data transmitter/receiver 203 of the wireless port 202 (S923) to the application unit 207 of the PJ 201 (S924) by the short range wireless transfer technique is projected onto the screen 301 by the image output unit 204 (S925). At this time, on the DSC 101 side, it is possible to adopt a configuration in which the image data file that has been transmitted to the PJ 201 is displayed on the display unit 105 of the DSC 101 (S926). It is also possible to adopt a configuration in which the projected image is continuously projected when the status of the PJ 201 is changed to "weak" status.

When the upper level disconnection timers activated by the application units 107 and 207 time out (S605, S606), an upper level disconnection is performed (S607), ending the image transferring status. The application units 107 and 207 each reset the settings of the image transferring status (S608, S609).

Figure 13:
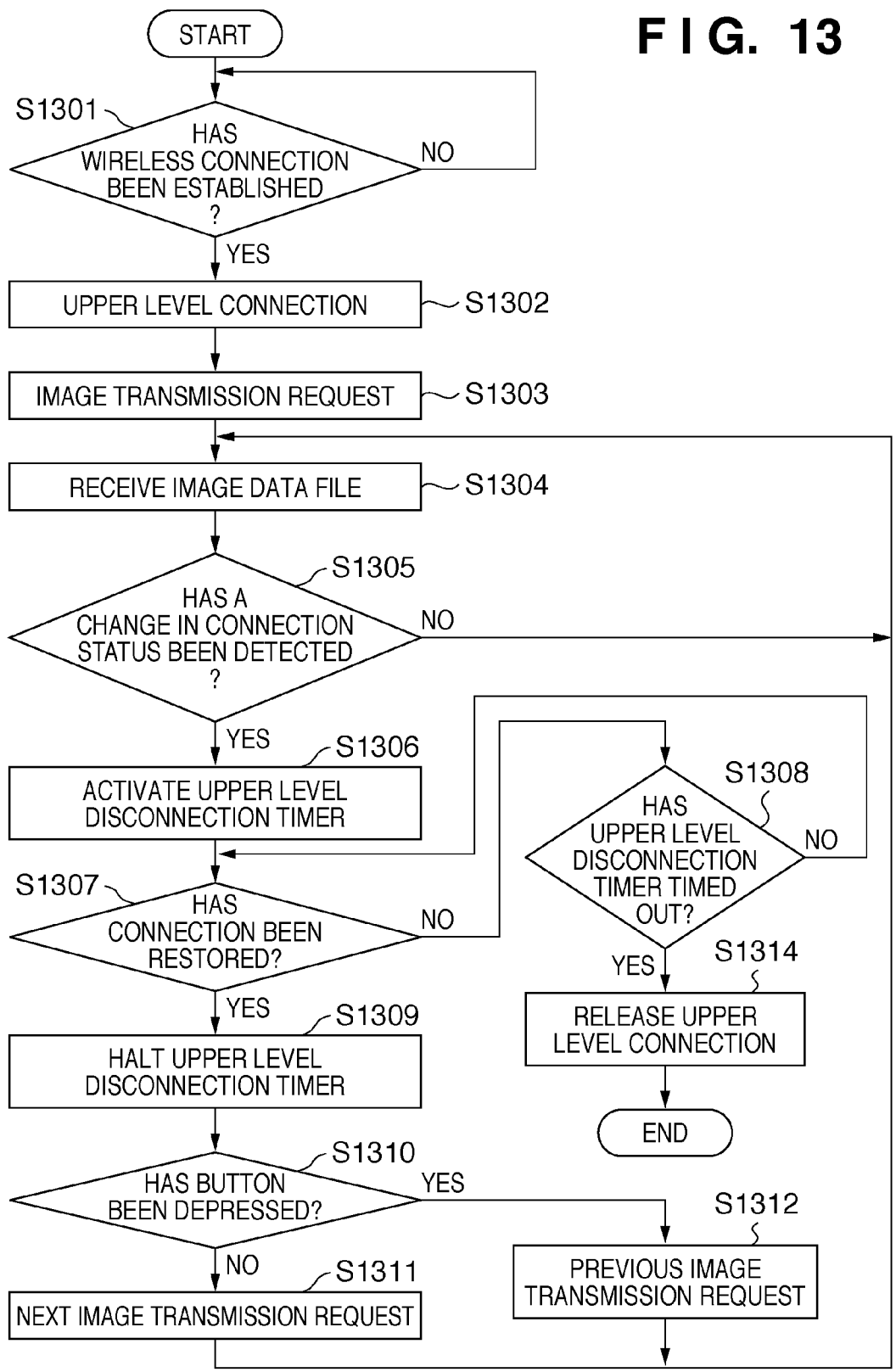
FIG. 13 is a flowchart used to illustrate an operation performed by a projector according to Embodiment 2.

The process performed by the PJ 201 for implementing the above sequence of Embodiment 3 is shown in the flowchart of FIG. 13. However, in step S1305, a change in the connected status is detected when the reception electric field intensity of the wireless connection falls below a preset threshold value. Likewise, in step S1307, the restoration of the wireless connection is detected when the reception electric field intensity of the wireless connection reaches or exceeds the preset threshold value. The operation of the DSC 101 is clear from the sequence diagrams of FIGS. 5, 6 and 9 as in Embodiment 2.

In the foregoing, the operation of transferring a different image data file from the previous one according to the electric field intensity of the short range wireless transfer technique in the wireless image output system of the present invention was described, but the wireless communication that can be used is not limited thereto, and for example, it is possible to use a wireless technique such as Bluetooth® or NFC.

It is also possible to adopt a configuration in which the previous image data file is transmitted from the DSC 101 by restoring the wireless connection while a button is depressed as in Embodiment 2. Furthermore, the button operation can be replaced by a configuration capable of recognizing a change in the status using a sensor or the like such as, for example, bringing the DSC 101 close to the wireless port 202 with the DSC 101 being overturned, or bringing the DSC 101 close to the wireless port 202 with increased acceleration.

Embodiment 4

In Embodiments 1 to 3, the selection of an image data file is changed by an operation such as depressing a button. In Embodiment 4, the period during which the connected status of wireless connection is maintained is measured, and the selection of an image data file is changed based on the measured period. Furthermore, in Embodiment 4, when the PJ 201 displays a previous image data file that has already been transmitted, control is performed such that the image data file stored in the PJ 201 is displayed, and an image data file is not transferred from the DSC 101. The configurations of a DSC 101, a PJ 201 and a data communication system according to Embodiment 4 are the same as those of Embodiment 1 (FIGS. 1 to 3). Hereinafter, an operation according to Embodiment 4 will be described with reference to FIGS. 4, 6, 10 and 11.

In Embodiment 4, in order to distinguish a connection method, each apparatus needs to determine whether the connection method is a contact method A or contact method B. First, a process for determining such a contact method will be described with reference to the flowchart of FIG. 10.

When the DSC 101 and the wireless port 202 are wirelessly connected by the short range wireless transfer technique (FIG. 4), the application units 107 and 207 detect that the wireless connection has been established by a notification from the radio data transmitter/receivers 102 and 203, respectively (S1001). Upon detecting the establishment of the wireless connection, the application units 107 and 207 of the apparatuses each activate a connection timer that monitors the time during which the connection is maintained (S1002). It is assumed that the apparatuses have a common time out value. When the connection is disconnected before the connection timers time out (S1003), the application units 107 and 207 of the apparatuses halt the connection timers (S1004) and determine that the wireless connection was a contact process B (S1005). When, on the other hand, the connection is continuously maintained and the connection timers time out (S1006), the application units 107 and 207 of the apparatuses determine that the wireless connection was a contact process A (S1007). At this time, it is also possible to adopt a configuration in which the time out value can be set by the user in advance.

Figure 11:
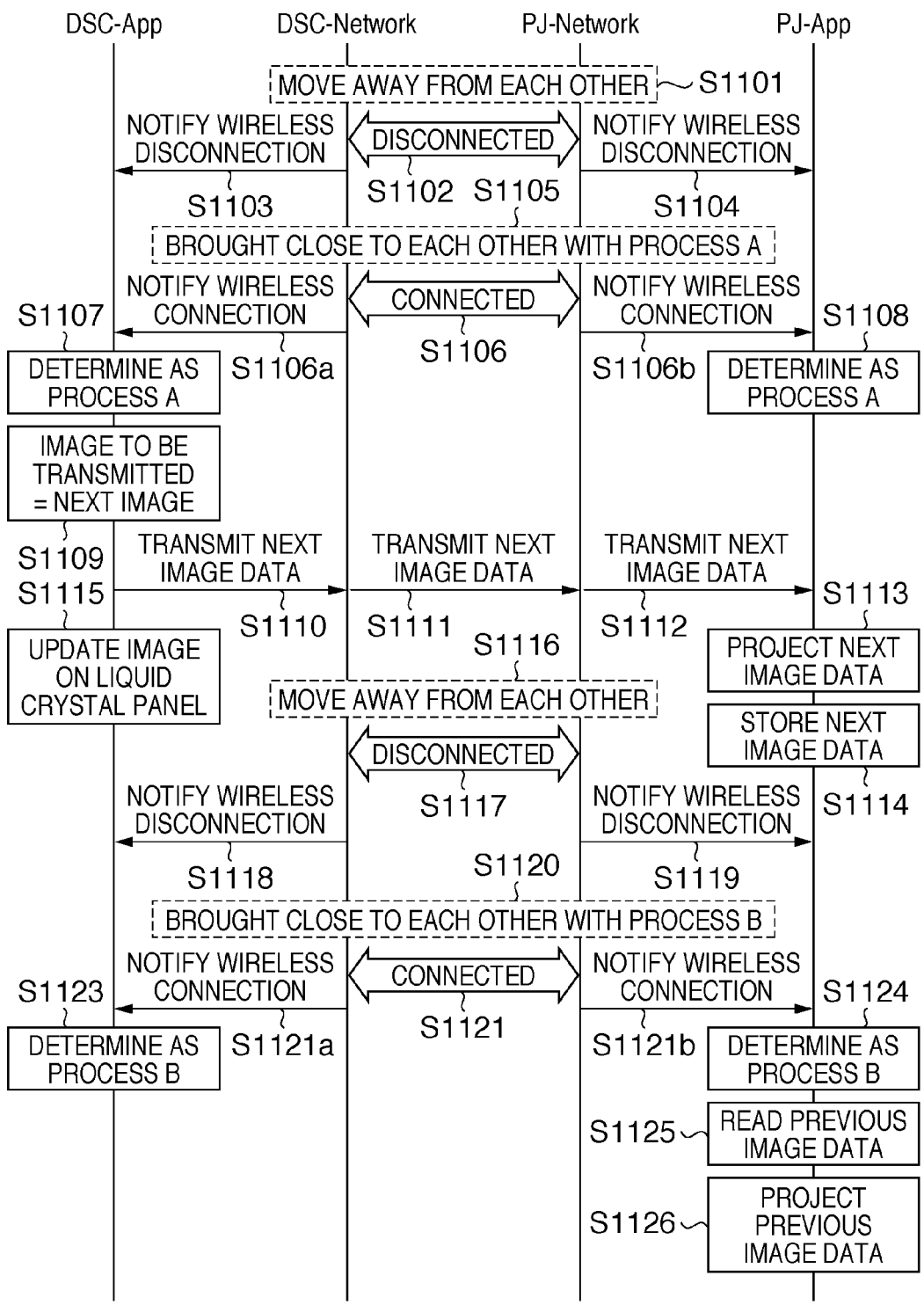
FIG. 11 is a main sequence diagram according to Embodiment 4.

An operation sequence performed by a data communication system according to Embodiment 4 will be described next with reference to the sequence diagrams of FIGS. 4, 6 and 11.

The operation performed by the user to project the image data being displayed on the display unit 105 of the DSC 101 with the PJ 201 was described in Embodiment 1 (FIG. 4), so a description thereof is omitted here.

When the user wants to project the next image stored in the storage unit 106 of the DSC 101 with the PJ 201, an operation as described below is performed.

Figure 10:
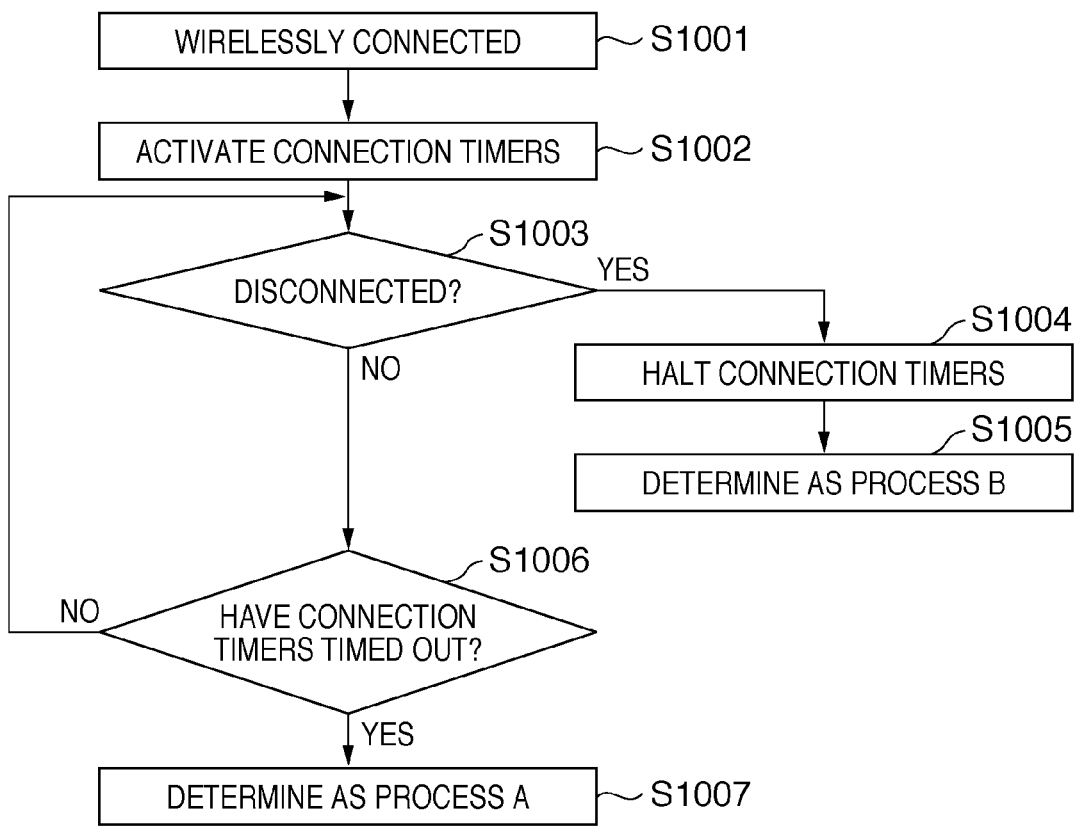
FIG. 10 is a flowchart showing a process for determining a contact method according to Embodiment 4.

First, the wireless connection is set to a contact process A by the user maintaining the connected status of the wireless connection until the connection timers time out (S1007 of FIG. 10). After that, the user moves the DSC 101, which was close to the wireless port 202, away from the wireless port 202 (S1101). Then, the DSC 101 and the PJ 201 enter a disconnected status by the short range wireless transfer technique (S1102). Within the respective apparatuses, the disconnected status is notified to each of the application units 107 and 207 (S1103, S1104). Each of the application units 107 and 207 that has received the notification activates their respective upper level disconnection timer. The value of the timer may be configured to be preset in the apparatus, or set by the user. The PJ 201 stops the projection of the image.

When the user moves the DSC 101 close to the wireless port 202 before the upper level disconnection timers time out (S1105), the DSC 101 and the PJ 201 again enter a connected status (S1106). The radio data transmitter/receivers 102 and 203 notify the application units 107 and 207, respectively, of the wireless connection (S1106a, S1106b). Each of the application units 107 and 207 determines the contact process (S1107, S1108), and halts their respective upper level disconnection timer. The application unit 107 of the DSC 101 that has determined that the connection was the contact process A transfers the next image data file from the storage unit 106 to the application unit 207 of the PJ 201 (S1109 to S1112). The next image data file transferred to the application unit 207 of the PJ 201 is projected onto the screen 301 by the image output unit 204 (S1113), and stored in the storage unit (206) of the PJ 201 (S1114). At this time, on the DSC 101 side, it is possible to adopt a configuration in which the image data file that has been transmitted to the PJ 201 is displayed on the display unit 105 of the DSC 101 (S1115). It is also possible to adopt a configuration in which the projected image is continuously projected in the disconnected status.

When the user wants to project the previous image stored in the storage unit 106 of the DSC 101 with the PJ 201, an operation as described below is performed.

First, the DSC 101, which was close to the wireless port 202, is moved away from the wireless port 202 (S1116). Then, the DSC 101 and the PJ 201 enter a disconnected status by the short range wireless transfer technique (S1117). Within the respective apparatuses, the disconnected status is notified to the application units 107 and 207 (S1118, S1119). Each of the application units 107 and 207 that has received the notification activates an upper level disconnection timer, and the PJ 201 stops the projection of the image.

When the user moves the DSC 101 close to the wireless port 202 using the contact process B before the upper level disconnection timers time out (S1120), the DSC 101 and the PJ 201 again enter a connected status (S1121). The radio data transmitter/receivers 102 and 203 notify the application units 107 and 207, respectively, of the wireless connection (S1121a, S1121b). Each of the application units 107 and 207 determines the contact process (S1123, S1124), and halts their respective upper level disconnection timer. In FIG. 11, a wireless connection notification and a wireless disconnection notification are not shown, but it is also possible to adopt a configuration in which such notifications are issued. The application unit 207 of the PJ 201 that has determined that the connection was the contact process B reads the previous image data file from the storage unit 206 (S1125), and the previous image data file is projected onto the screen 301 by the image output unit 204 (S1126).

When the wireless connection is disconnected as a result of the DSC 101 being moved away from the wireless port 202, and the upper level disconnection timers activated by the application units 107 and 207 time out (S605, S606), an upper level disconnection is performed (S607), ending the image transferring status. The application units 107 and 207 each reset the settings of the image transferring status (S608, S609).

As described above, in Embodiment 4, when the PJ 201 displays a previous image data file that has already been transmitted, the image data file stored in the PJ 201 is displayed, and the transfer of an image data file from the DSC 101 is prohibited. Accordingly, unnecessary transfer of an image data file between the DSC 101 and the PJ 201 can be eliminated.

In the foregoing, the operation of transferring a different image data file from the previous image data file under control of the DSC according to the connection/disconnection by the short range wireless transfer technique in the wireless image output system of the present invention was described, but the wireless communication that can be used is not limited thereto, and for example, it is possible to use the connection/disconnection by a wireless technique such as Bluetooth® or NFC.

In Embodiment 4, a configuration is adopted in which a connection timer is provided to each of the DSC 101 and the PJ 201, each apparatus determines a contact process (wireless connection status) type, and when displaying a previous image data file, the PJ 201 obtains the data from the storage unit 206 of the PJ 201. However, the use of the wireless connection status type is not limited thereto, and it is possible to, for example, use the wireless connection status type instead of depressing a button when the connection is restored according to Embodiments 1 and 2. For example, when it is applied to Embodiment 1, the branches in the process of step S1209 of FIG. 12 may be performed with the wireless connection status type determined in the process of FIG. 10. Likewise, when it is applied to Embodiment 2, the branches in the process of step S1306 of FIG. 13 may be performed with the wireless connection status type. Needless to say, the wireless connection status type is not limited to those shown in the above embodiment.

According to the present invention, when transferring a data file by wireless communication established between apparatuses, user's intention can be reflected in selecting a data file to be transferred.

The present invention is also achievable in embodiments such as a system, an apparatus, a method, a program, or a storage medium. Specifically, it may also be applied to a system constituted by multiple devices and may also be applied to an apparatus constituted by a single device.

Note that the case where the functionality of the above-mentioned embodiment is achieved by directly or remotely supplying a software program to a system or device and reading out and executing the supplied program code through a computer in the system or device is included in the scope of the present invention. In this case, the supplied program is a computer program that corresponds to the flowchart indicated in the drawings in the embodiment.

Accordingly, the program code itself, installed in a computer so as to realize the functional processing of the present invention through a computer, also realizes the present invention. In other words, the computer program itself, for realizing the functional processing of the present invention, is also included within the scope of the present invention.

In this case, object code, a program executed through an interpreter, script data supplied to an OS, or the like may be used, as long as it has the functions of the program.

Examples of the a computer readable storage medium that can be used to supply the computer program include Floppy® disks, hard disks, optical disks, magneto-optical disks, MOs, CD-ROMs, CD-Rs, CD-RWs, magnetic tape, non-volatile memory cards, ROMs, and DVDs (DVD-ROMs, DVD-Rs).

Using a browser of a client computer to connect to an Internet homepage and downloading the computer program of the present invention to a storage medium such as a hard disk can be given as another method for supplying the program. In this case, the downloaded program may be a compressed file including a function for automatic installation. Furthermore, this method may be realized by dividing the program code that makes up the program of the present invention into a plurality of files and downloading each file from different homepages. In other words, a WWW server that allows a plurality of users to download the program files for realizing the functional processing of the present invention through a computer also falls within the scope of the present invention.

Furthermore, the program of the present invention may be encrypted, stored in a storage medium such as a CD-ROM, and distributed to users. In this case, a user that has cleared a predetermined condition is allowed to download key information for removing the cryptography from a homepage via the Internet, use the key information to decrypt the program, and install the program on a computer.

Also, the functions of the present embodiment may be realized, in addition to through the execution of a loaded program using a computer, through cooperation with an OS or the like running on the computer based on instructions of the program. In this case, the OS or the like performs part or all of the actual processing, and the functions of the above-described embodiment are realized by that processing.

Furthermore, part or all of the functionality of the aforementioned embodiment may be written into a memory provided in a function expansion board installed in the computer, a function expansion unit connected to the computer, or the like, into which the program read out from the storage medium is written. In this case, after the program has been written into the function expansion board or the function expansion unit, a CPU or the like included in the function expansion board or the function expansion unit performs part or all of the actual processing based on the instructions of the program.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application is a National Stage application under 35 U.S.C. §371 of International Application No. PCT/JP2009/060409, filed on Jun. 2, 2009, which claims priority to Japanese Application No. 2008-171243, filed on Jun. 30, 2008, the contents of each of the foregoing applications being incorporated by reference herein.

The invention claimed is:

1. A communication apparatus comprising:
a detection unit configured to detect disconnection of a wireless connection with an external device
an output unit configured to, in a case that a second wireless connection is established before a first time period elapses after the detection unit detects that a first wireless connection was disconnected, change data to be output from a first data file to a second data file different from the first data file and output the second data file in response to the establishment of the second wireless connection; and
a terminating unit configured to terminate a process in a case where the second wireless connection is not established before the first time period elapses after the detection unit detects a disconnection of the first wireless connection.

2. The apparatus according to claim 1, wherein the detection unit detects that a reception electric field intensity of the wireless connection has fallen below a preset threshold value.

3. The apparatus according to claim 1, further comprising a determination unit configured to determine a status of a predetermined operation part of the communication apparatus when the second wireless connection is established,
wherein the output unit performs control to output a plurality of data files held by the communication apparatus in order of sorting the data files by a preset criteria, and determines a data file that comes after a data file output before the establishment of the second wireless connection in order or a data file that comes before the same as the second data file to be output according to the status of the operation part determined by the determination unit.

4. The apparatus according to claim 1, further comprising a measurement unit configured to measure a period during which the first wireless connection is in the connected status until the detection unit detects the disconnection of the first wireless connection,
wherein the output unit performs control to output a plurality of data files held by the communication apparatus in order of sorting the data files by a preset criteria, and determines a data file that comes after a data file transmitted before the establishment in order or a data file that comes before the same as the second data file to be transmitted according to whether or not the period during which the first wireless connection is in the connected status measured by the measurement unit is larger than a preset threshold value.

5. The apparatus according to claim 1, wherein the output unit transmits the second data file in response to the establishment of the second wireless connection.

6. The apparatus according to claim 1, wherein the output unit transmits the second data file and displays the second data file.

7. The apparatus according to claim 1, wherein the first data file is a data file that is displayed when the first wireless connection is established.

8. The apparatus according to claim 1, wherein the first and second wireless connections are a wireless connection with the external apparatus using NFC.

9. The apparatus according to claim 1, wherein the process is a process for outputting a data file different from a data file that is being displayed.

10. The apparatus according to claim 1, further comprising a requesting unit configured to request the external to transmit the second data file in response to detection of the establishment of the second wireless connection,
wherein the output unit outputs the second data file that was received in response to the request.

11. A system including a communication apparatus and an external apparatus, the system comprising:
a detection unit configured to detect disconnection of a wireless connection between the communication apparatus and the external apparatus;
an output unit configured to, in a case that a second wireless connection is established between the communication apparatus and the external apparatus before a first time period elapses after the detection unit detects that a first wireless connection between the communication apparatus and the external apparatus was disconnected, change data to be output from a first data file to a second data file different from the first data file and output the second data file in response to the establishment of the second wireless connection; and
a terminating unit configured to terminate a process in a case where the second wireless connection is not established before the first time period elapses after the detection unit detects a disconnection of the first wireless connection.

12. The system according to claim 11,
wherein when the first wireless connection between the communication apparatus and the external apparatus is established, an upper level protocol is logically brought into a connected status, and
in a case where the second wireless connection is not established before the first time period elapsed after the detection unit detected a disconnection of the first wireless connection, the upper level protocol is logically brought into a disconnected status.

13. A method of controlling a communication apparatus comprising the steps of:
detecting a disconnection of a wireless connection with an external apparatus;
in a case that a second wireless connection is established before a first time period elapses after it is detected in the detecting step that a first wireless connection was disconnected, changing data to be output from a first data file to a second data file different from the first data file and outputting the second data file in response to the establishment of the second wireless connection; and
terminating in a case where the second wireless connection is not established before the first time period elapses after a disconnection of the first wireless connection is detected.

14. A non-transitory computer-readable storage medium storing a program that causes a computer to execute the control method according to claim 13.

15. A method of controlling a system including a communication apparatus and an external apparatus, the method comprising the steps of:
detecting a disconnection of a wireless connection between the communication apparatus and the external apparatus;
in a case that a second wireless connection is established between the communication apparatus and the external apparatus before a first time period elapses after the detection that a first wireless connection between the communication apparatus and the external apparatus was disconnected, changing data to be output from a first data file to a second data file different from the first data file and outputting the second data file in response to the establishment of the second wireless connection; and
terminating in a case where the second wireless connection is not established before the first time period elapses after the detection of disconnection of the first wireless connection.

16. A communication apparatus comprising:
a detection unit configured to detect that an electric field intensity of a first signal from an external apparatus has fallen below a predetermined value;
an output unit configured to, in a case that it is detected that an electric field intensity of a second signal from the external apparatus is greater than the predetermined value before a first time period elapses after the detection unit detects that the electric field intensity of the first signal has fallen below the predetermined value, change data to be output from a first data file that was output before the detection of the detection unit to a second data file different from the first data file and output the second data file in response to the detection that the electric field intensity of the second signal is greater than the predetermined value; and
a terminating unit configured to terminate a process in a case that it is not detected that the electric field intensity of the second signal from the external apparatus is greater than the predetermined value before the first time period elapses after the detection unit detects that the electric field intensity of the first signal has fallen below the predetermined value.

17. A method of controlling a communication apparatus comprising the steps of:
detecting that an electric field intensity of a first signal from an external apparatus has fallen below a predetermined value;
in a case that it is detected in the detecting step that an electric field intensity of a second signal from the external apparatus is greater than the predetermined value before a first time period elapses after it is detected that the electric field intensity of the first signal has fallen below the predetermined value, changing data to be output from a first data file that was output before the detection of the detection unit to a second data file different from the first data file and outputting the second data file in response to the detection that the electric field intensity of the second signal is greater than the predetermined value; and terminating in a case that it is not detected that the electric field intensity of the second signal from the external apparatus is greater than the predetermined value before the first time period elapses after it is detected that the electric field intensity of the first signal has fallen below the predetermined value.

* * * * *